United States Patent
Mimura

[19]

[11] Patent Number: 6,128,955
[45] Date of Patent: Oct. 10, 2000

[54] METHOD FOR MEASURING 6 DEGREES OF FREEDOM MOTION AND DEVICE THEREFOR

[76] Inventor: Nobuharu Mimura, 8050, Ikarashi 2, Niigata-shi, Niigata-ken, Japan

[21] Appl. No.: 09/349,598

[22] Filed: Jul. 9, 1999

[51] Int. Cl.$^7$ ........................................................ G01P 3/04
[52] U.S. Cl. ................................................................. 73/510
[58] Field of Search ................................ 73/510, 511, 512

[56] References Cited

U.S. PATENT DOCUMENTS

| | | |
|---|---|---|
| 4,590,801 | 5/1986 | Merhav ..................................... 73/510 |
| 5,383,363 | 1/1995 | Kulmaczewski .......................... 73/510 |

FOREIGN PATENT DOCUMENTS

| | | |
|---|---|---|
| 6-90218 | 11/1994 | Japan . |
| 2622297 | 4/1997 | Japan . |

*Primary Examiner*—Richard A. Moller
*Attorney, Agent, or Firm*—Quarles & Brady LLP

[57] ABSTRACT

A method and device for measuring a motion of a rigid body, using the least possible accelerometers that are simply arranged. One-axis uni-directional accelerometers 1 through 6 are each fixed to the rigid body through a base 12. Thus, no Coriolis force is developed even though an external force is applied thereto. The six one-axis uni-directional accelerometers 1 through 6 are mounted to three or more different positions relative to the rigid body. Consequently, a processing unit 21 can perform processing so that centrifugal and angular effects included in each one-axis uni-directional accelerometer may be separated. As the one-axis uni-directional accelerometers 1 through 6 are arranged on the same plane, you have only to consider two-dimensional positional relationship among the accelerometers for the accuracy of the arrangement thereof.

14 Claims, 10 Drawing Sheets

F I G. 9
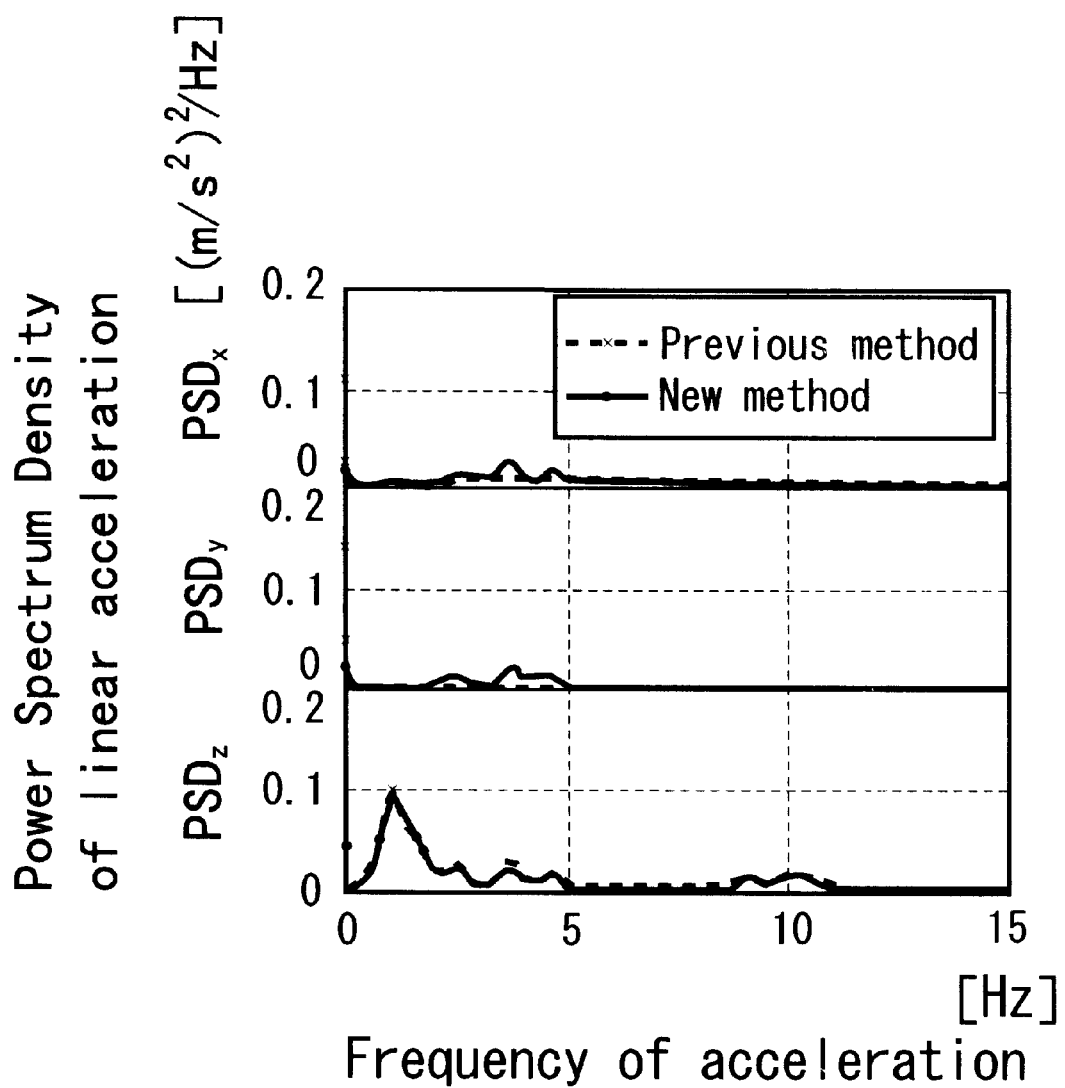

F I G. 1 0
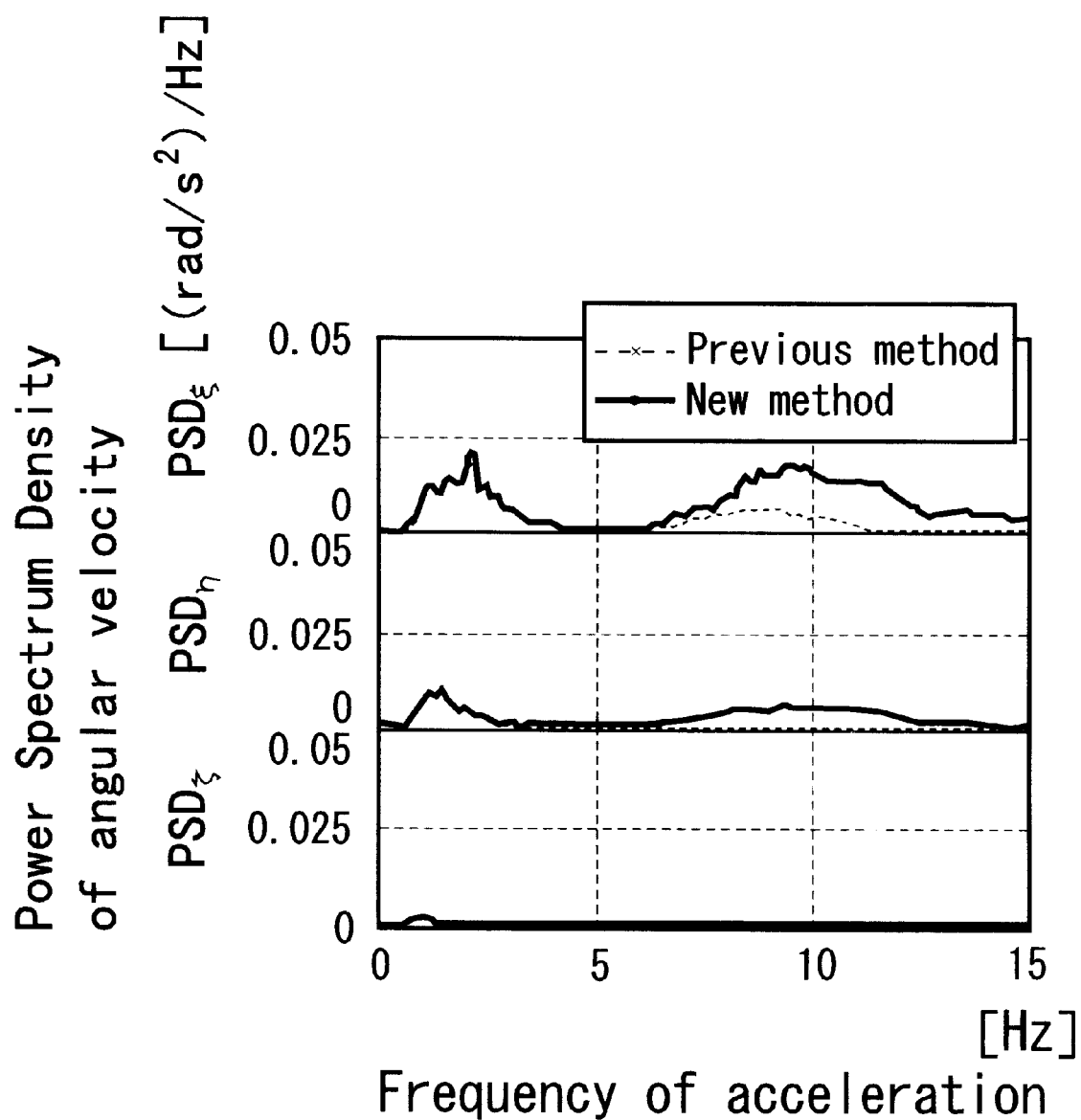

METHOD FOR MEASURING 6 DEGREES OF FREEDOM MOTION AND DEVICE THEREFOR

BACKGROUND OF THE INVENTION

1. Filed of the Invention

The present invention relates to a method for measuring a 6 degrees of freedom (DOF) motion of a rigid body such as vehicle, and a device therefor.

2. Prior Art

In recent years, due to diversified types and enhanced performances of vehicles, the measurement and evaluation of human vibrations and vibration intervals, which provide criteria of how comfortable a rider in a car feels or so-called driving feeling (e.g. sense of maneuverability, stability, braking ability and the like), are becoming increasingly important. Particularly, it is widely expected that the evaluation relative to a wider range of subjects such as beginner drivers, aged persons, and so on will become increasingly important hereafter. For such evaluation, it is necessary to measure a motion of a moving vehicle with a sufficient band width (i.e., in the range of up to about DC 20 Hz).

Conventionally, a three-axis linear accelerometer and a three-axis mechanical rate gyroscope have been recognized as measurement devices for measurement of 6 degrees of freedom (DOF) motion of a rigid body such as vehicle. However, for a vehicle which performs such a complex motion of 6 DOF, the center of rotational motion is not constant, and acceleration signals to be detected by the linear accelerometer involve not only linear acceleration but also centrifugal and angular effects, which, therefore, must be separated therefrom. Whilst angular velocity data or angular acceleration data are necessary for such separation, a conventional rate gyroscope has such a low response characteristic that a measurable range has been limited to a motion of low speed, and its phase characteristics also is different from that of linear accelerometer, so that it has a drawback that it is not suitable for separation of signals.

Further, due to limited installing positions of such conventional measurement devices for real vehicles, coordinate transformation such as the transformation of measured linear acceleration and angular acceleration into arbitrary position or posture has often been necessary. For such coordinate transformation, the measured linear acceleration and angular acceleration must be combined with each other, for which, however, a conventional rate gyroscope is not considered suitable for the same reasons discussed above.

To solve the above-mentioned problems, there is proposed one method or device for measurement of angular acceleration (angular velocity) without the use of rate gyroscope, in which several (nine, for example) one-axis accelerometers are combined one another three-dimensionally. With such measurement method, however, there are problems such that the device becomes large-sized, requiring the accuracy of disposition of each one-axis accelerometer, and that the algorithm for analysis of output signals from the one-axis accelerometers becomes complicated.

Also, there are proposed other devices for measurement of this kind, some of the representatives of which are disclosed in Japanese Examined Patent Publication No. 6-90218 and Japanese Registered Patent Publication No. 2622297.

In the No. 6-90218 publication is proposed a device which comprises a casing and six support legs for restraining an overall 6 DOF motion of an inertia body, each support leg being disposed between the casing and the inertia body, having a force-detector mounted thereto, thus detecting urging forces applied to each leg thereby to measure all the accelerations of 6 DOF. However, as each leg is disposed three-dimensionally in a space inside the casing, the above-mentioned problems, such as the large-sized device and the requirement for accuracy of disposition, are unavoidable. In addition, as an inertia body is shifted by the forces from external due to the expansion or shrinkage of the legs, there would be structurally developed the Coriolis force. Nevertheless, as the outputs from the six force-detectors are simply converted into linear matrix for analysis, disregarding the Coriolis force and centrifugal effects when processing, you would be unable to measure accelerations other than slight acceleration and angular acceleration (or angular velocity). This is due to the fact that an inertia body in a three-dimensional space is subjected not only to inertial forces derived from accelerations and angular accelerations, but also to the Coriolis force and centrifugal forces, which act upon one another in a very complex manner, thus causing errors. Accordingly, you cannot expect the accurate measurement of 6 DOF motion in a three-dimensional space without taking such causes for errors into consideration.

On the other hand, in the No. 2622297 publication is proposed a device which comprises: first and second radial magnetic bearings and a pair of thrust magnetic bearings, said bearings holding in place a rotational body which rotates around the X axis; a detector for detecting the number of rotation of the rotational body; and five displacement-detectors for detecting the displacement of the rotational body, said displacement being defined in the directions of the Y, Z axes and the thrust, respectively, whereby the displacement acceleration and displacement angular acceleration of the rotational body are calculated and output, while correcting the displacement in the radial and thrust directions of the rotational body. Although the principle disclosed in this publication is analogous to the one disclosed in the No. 6-90218 publication, the structure becomes more complicated due to the presence of the rotational body. Whilst the prior art also teaches that the detection by the displacement-detectors may be performed, taking advantage of the Coriolis force which is developed when an angular velocity is developed around the Y axis of the rotational body, such method would result either in the incomplete separation of the Coriolis force and centrifugal effects, or in the dispersion of the output signals, and thus stable measurement would be impossible.

In other words, the conventional six-axis accelerometers have been structured without the sufficient analyses of the relationships of the acceleration and angular acceleration relative to an inertia body, even under the condition where the Coriolis force and centrifugal effects are developed structurally. Therefore, although they would work well relative to an inertia body moving on a two-dimensional plane, they, in a three-dimensional space, are unable to completely remove the effects of the Coriolis force and centrifugal forces which interfere complexly in the direction of each axis, or otherwise, they allow the output signals to be dispersed, and thus there is a likelihood that no stable measurement is able to be performed.

SUMMARY OF THE INVENTION

To eliminate the above-mentioned problems, it is, therefore, an object of the present invention to provide a method for measuring 6 DOF motion, which enables the accurate measurement of a motion of a rigid body, using the least possible accelerometers that are simply disposed.

Further, it is another object of the present invention to provide a device for measuring 6 DOF motion, which enables the accurate measurement of a motion of a rigid body, using the least possible accelerometers that are simply disposed.

To attain the above objects, there is provided a method for measuring a 6 DOF motion of a rigid body, which comprises the steps of: fixing at least six one-axis uni-directional accelerometers to three or more different positions on the same plane as that of a rigid body; and then carrying out processing, using acceleration signals output from each of the one-axis uni-directional accelerometers so that the effects of centrifugal acceleration and rotational angular acceleration included in each one-axis uni-directional accelerometer may be separated therefrom.

Also, there is provided a device for measuring a 6 DOF motion of a rigid body, which comprises: at least six one-axis unidirectional accelerometers fixed to three or more different positions on the same plane as that of a rigid body; and a processing unit for carrying out processing, using acceleration signals output from each of the one-axis uni-directional accelerometers so that the effects of centrifugal acceleration and rotational angular acceleration included in each one-axis uni-directional accelerometer may be separated therefrom.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which:

FIG. 9 is a graph showing the power spectrum density characteristics of linear acceleration comparing between a conventional measurement device and a measurement device according to the invention.

FIG. 10 is a graph showing the power spectrum density characteristics of angular velocity comparing between a conventional measurement device and a measurement device according to the invention.

DETAILED DESCRIPTION OF THE INVENTION

Figure 1:
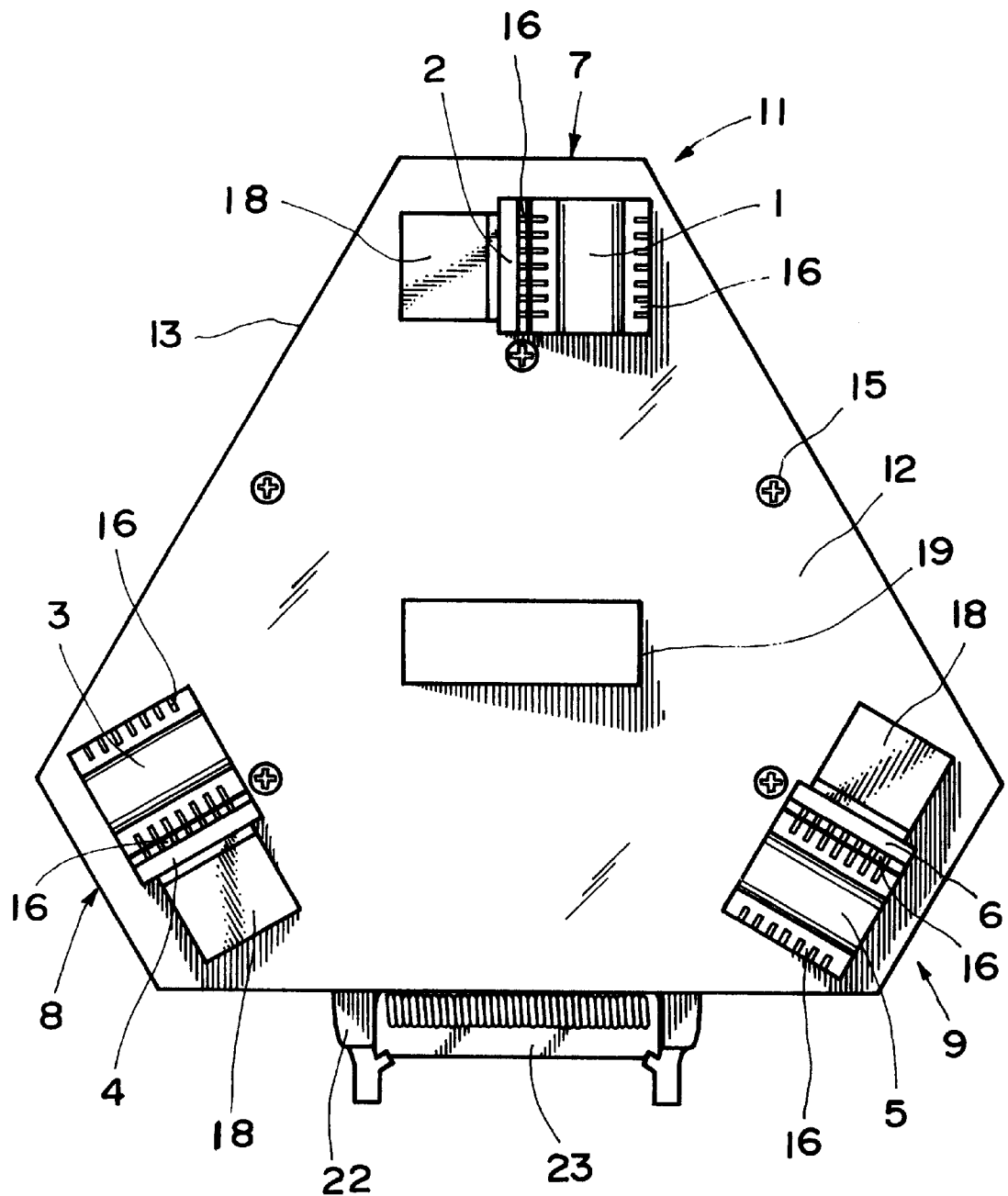
FIG. 1 is a plan view showing a device in accordance with an embodiment of the invention, particularly illustrating a detector body thereof.

Hereinafter is explained an embodiment of the invention with reference to the attached drawings.

Initially, the structure of a detecting portion of a measurement device of the invention will be explained with reference to FIGS. 1 and 2.

Reference numeral 11 designates a detecting body whose outer shell is constructed of a flat base 12 and a casing 13 for covering the upper surface of the base 12, said casing 13 being made of transparent resin material, for example. On the base 12 are vertically provided several linkage bars 14. From the upper surface of the casing 13 are inserted screws 15 into the upper ends of the linkage bars 14, thus fixing the base 12 to the casing 13. Whilst the base 12 and the casing 13 are each hexagon-shaped in plan view, their configurations should not be limited to the same. The detector body 11 is mounted to an optional rigid body in motion, such as a moving vehicle, Reference numerals 1 through 6 each designate a strain-gauge type or a capacitance type one-axis uni-directional accelerometer. In the present embodiment, the number of such one-axis unidirectional accelerometers is six, which is the minimal number to enable the accurate measuring of acceleration in terms of the X, Y and Z axes, and angular acceleration. These one-axis uni-directional accelerometers 1 through 6 each comprise a sensor and various types of signal conditioners formed on the same silicone tip, employing the uniform frequency response characteristic and phase characteristic. Each of the one-axis uni-directional accelerometers 1 through 6 is mounted onto a substrate 16 by soldering. Such one-axis uni-directional accelerometers 1 through 6, being basically structured by a silicone tip, enables the small-sizing of a measurement device. Further, as a signal processing circuit such as an amplifier, is integrated therewith, it is advantageous in that the structure of a hereinbelow-described processing unit 21 can be simplified. The base 12 is fixedly mounted to an object to be measured, i.e., a rigid body (not shown). In other words, the one-axis uni-directional accelerometers 1 through 6 are moved together with a rigid body when a force from external is applied to the rigid body, and thus, no Coriolis force is developed structurally. This is another advantage which conventional 6 DOF motion measurement devices do not have.

The one-axis uni-directional accelerometers 1, 3 and 5 are provided so that the respective sensing directions may coincide with the direction of the Z axis, which is orthogonal to the flat base 12. The remaining accelerometers 2, 4 and 6 are provided so that the respective sensing directions may coincide with any arbitrary directions parallel to the X-Y plane which is orthogonal to the said Z axis. Namely, a first group consisting of the one-axis uni-directional accelerometers 1, 3 and 5 has a sensing direction directed to the Z axis, while a second group consisting of the one-axis uni-directional accelerometers 2, 4 and 6 has a sensing direction directed to respective directions which are parallel to the X-Y plane. Between each substrate 16 for the accelerometers 1, 3 and 5 and the base 12 is provided an adjustment member 17 which allows respective heights of the one-asis uni-directional accelerometers 1, 3 and 5 to align to be the centers of the remaining accelerometers 2, 4 and 6. Although the adjustment member 17 is an optional one, it is desirable because it allows an initial point of each sensing direction of the one-axis uni-directional accelerometers 1, 3 and 5 to align with each sensing direction of the accelerometers 2, 4 and 6, so that the subsequent processing is simplified. In addition, on the base 12 are disposed L-shaped angle members 18, each having a vertical face. To the respective vertical faces of the angle members 18 are bonded respective upper flat faces of the one-axis uni-directional accelerometers 2, 4 and 6, whereby these accelerometers 2,4 and 6 as well as the respective substrates for mounting them thereto are each held in the vertical direction.

The one-axis uni-directional accelerometers 1 and 2 which construct a first detector portion 7 are provided integrally in approximately the same position, being close to each other. Likewise, the accelerometers 3 and 4 which construct a second detector portion 8, and the accelerometers 5 and 6 which construct a third detector portion 9, are also provided integrally in approximately the same positions, being close to each other, respectively. The first detector portion 7, the second detector portion 8 and the third detector portion 9 are each disposed in different positions on the base 12. Although the six one-axis uni-directional accelerometers 1 through 6 may be disposed on any arbitrary positions on the same plane, they must be positioned in at least three different positions on the same, the reason for which will be explained in a paragraph relating to a hereinafter-described measurement principle.

In the meantime, reference numeral 19 designates a level regulator, having several variable resistances. This level regulator 19 serves to suitably regulate the levels of output signals from each of the one-axis uni-directional accelerometers 1 through 6, but it is not always necessary to provide the same inside the detector body 11. Preferably, the casing 13 opposite to the level regulator 19 may be provided with an aperture in order that the regulation by the level regulator 19 may be carried out without opening or closing the casing 13.

Figure 3:
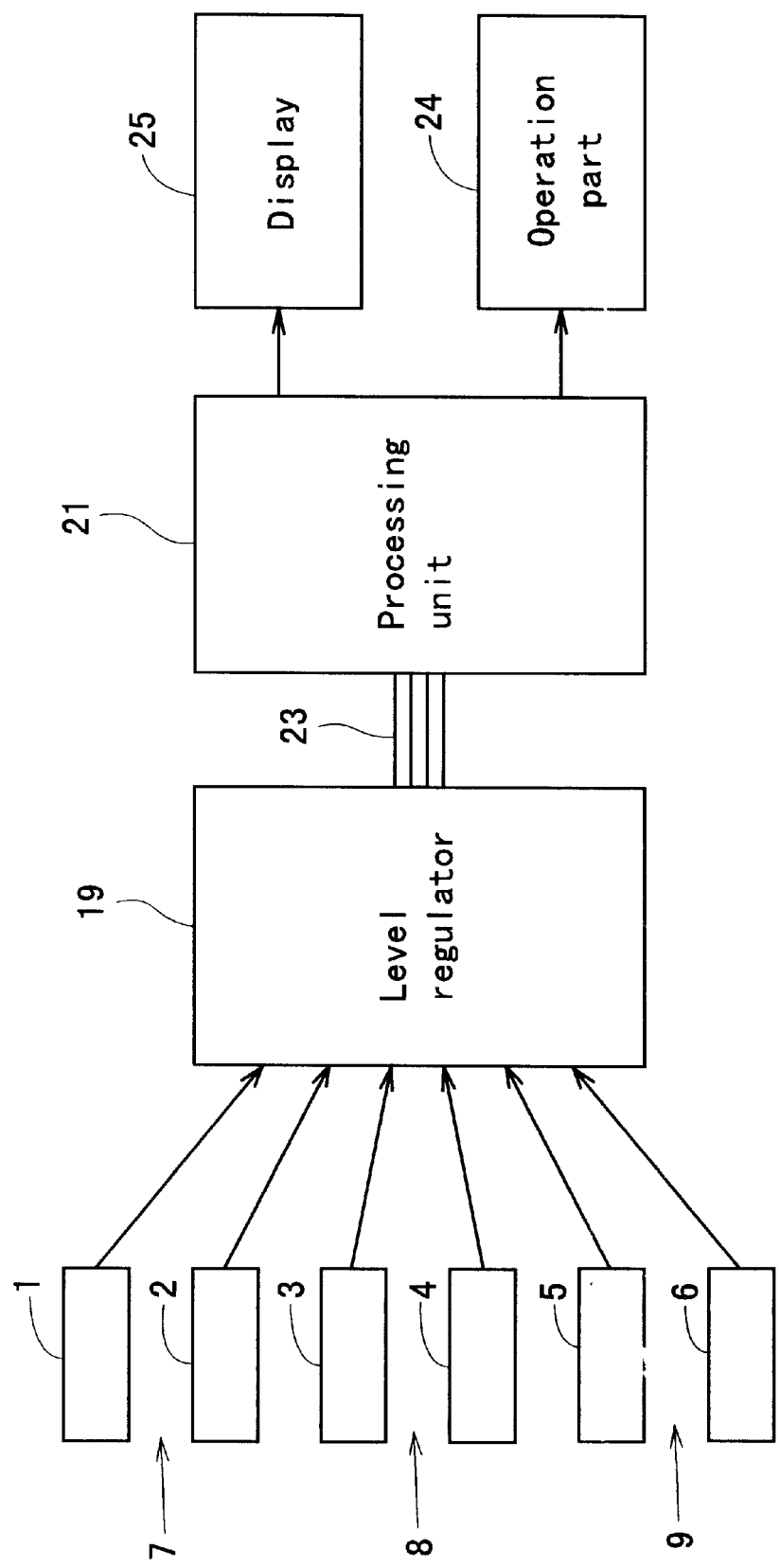
FIG. 3 is a block diagram showing an electrical structure of the device as shown in FIG. 1.

In FIG. 3 which is a block diagram showing an electrical structure of a device according to the invention, reference numeral 21 designates a processing unit 21 for processing each output signal from the level regulator 19. A general purpose personal computer or the like, for example, may be employed for this processing unit 21. The level regulator 19 is connected to the processing unit 21 across a flat cable 23, said flat cable 23 being removably coupled with a socket 22 (see FIG. 1) provided on one side of the detector body 11. Reference numeral 24 designates an operating portion such as a keyboard for outputting operation signals to the processing unit 21. Reference numeral 25 designates a display portion such as a CRT or the like, for displaying the results of measurement of linear acceleration, angular acceleration and other data. The processing unit 21 has a function to analyze output signals from each of the one-axis uni-directional accelerometers 1 through 6 and thus measure 6 DOF velocity and acceleration, through a control sequence of a program owned by the unit 21 itself.

Next, the principle of the measurement of the acceleration developed on a moving rigid body according to an embodiment of the invention will be described in detail with reference to FIGS. 4 and 5.

Figure 4:
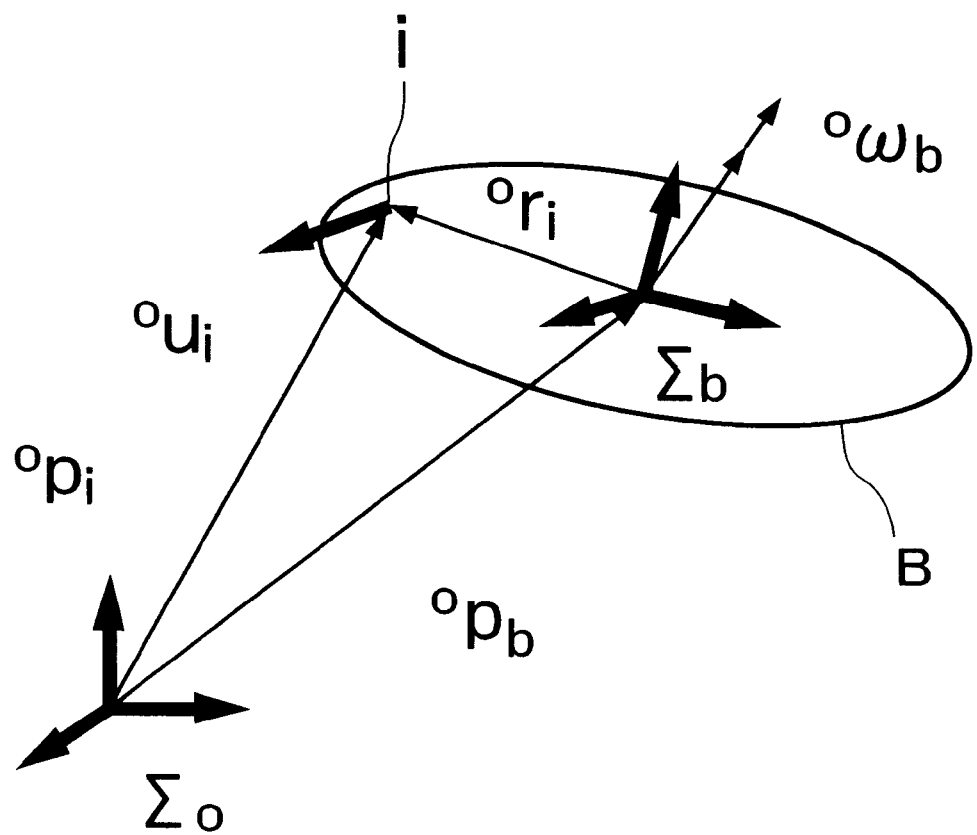
FIG. 4 is a schematic explanatory diagram illustrating a case where a single accelerometer is disposed on a rigid body.

In FIG. 4 which is drawn for the purpose of simplicity, a single one-axis uni-directional accelerometer is disposed on a rigid body B which moves in a static coordinate system or rest frame Σo. In the same Figure, Σb designates a coordinate system, fixed to the rigid body B in motion, in which a position vector $^\circ p_b$ of the origin of the coordinate system Σb, as viewed from the rest frame Σo, is expressed by the following equation 1:

$$^\circ p_b = [^\circ p_{bx} \, ^\circ p_{by} \, ^\circ p_{bz}]^T \qquad \text{Equation 1}$$

In the above equation 1, each left affix of the vector $^\circ p$ indicates a coordinate system the vector belongs to. An arbitrary point "i" on the rigid body B can be expressed, using a position vector $^\circ r_i$, by the following equation 2:

$$^\circ r_i = [^\circ r_{ix} \, ^\circ r_{iy} \, ^\circ r_{iz}]^T \qquad \text{Equation 2}$$

At this time, the position vector $^\circ p_i$ of the above point i as viewed from the rest frame Σo will be the sum of the position vector $^\circ p_b$ and the position vector $^\circ r_i$, as shown in the following equation 3:

$$^\circ p_i = ^\circ p_b + ^\circ r_i \qquad \text{Equation 3}$$

When the rigid body B is rotating around the origin of the coordinate system Σb at an angular velocity $^\circ \omega_b$, both sides of the above equation 3 are differentiated with respect to time t, thus obtaining a velocity relational equation as shown by the following equation 4:

$$^\circ \dot{p}_i = ^\circ \dot{p}_b + ^\circ \omega_b \times ^\circ r_i \qquad \text{Equation 4}$$

Similarly, an acceleration relational equation is shown by the following equation 5:

$$^\circ \ddot{p}_i = ^\circ \ddot{p}_b + ^\circ \dot{\omega}_b \times ^\circ r_i + ^\circ \omega_b \times (^\circ \omega_b \times ^\circ r_i) \qquad \text{Equation 5}$$

Reviewing a case where the one-axis unidirectional accelerometer is mounted to the point i on the rigid body B, in which a unit vector for indicating the sensing direction of this one-axis unidirectional accelerometer is denoted by $^\circ u_i$, while the output (one-axis acceleration) of the same accelerometer by "ai", then this one-axis acceleration ai is expressed by the following equation 6:

$$a_i = ^\circ u_i^T \, ^\circ \ddot{p}_i \qquad \text{Equation 6}$$

Then, the $^\circ p_i$ of the equation 5 is substituted into that of the equation 6, so that the one-axis acceleration "ai" is expressed by the following equation 7:

$$a_i = ^\circ u_i^T \{^\circ \ddot{p}_b - ^\circ R_i \, ^\circ \dot{\omega}_b + ^\circ \omega_b \times (^\circ \omega_b \times ^\circ r_i)\} \qquad \text{Equation 7}$$

$$= [^\circ u_i^T \; -^\circ u_i^T \, ^\circ R_i] \begin{bmatrix} ^\circ \ddot{p}_b \\ ^\circ \dot{\omega}_b \end{bmatrix} + ^\circ u_i^T \{^\circ \omega_b \times (^\circ \omega_b \times ^\circ r_i)\}$$

where $^\circ R_i$ in the equation 7 can be expressed as a matrix shown below:

$$^\circ R_i = \begin{bmatrix} 0 & -^\circ r_{iz} & ^\circ r_{iy} \\ ^\circ r_{iz} & 0 & -^\circ r_{ix} \\ -^\circ r_{iy} & ^\circ r_{ix} & 0 \end{bmatrix} \qquad \text{Equation 8}$$

The second term of the right side of the equation 7 expresses effects of centrifugal acceleration and angular acceleration that get mixed in the acceleration signals from the one-axis uni-directional accelerometer. As the equation 7 involves more unknown quantity than measured value, it is impossible to remove such centrifugal and angular effects, using such a single acceleration datum only.

Then, the present invention proposes that a plurality of one-axis uni-directional accelerometers be mounted to different positions and in the different directions, and then respective acceleration data obtained therefrom be fused together. Assuming that n one-axis uni-directional accelerometers are mounted to arbitrary position $^\circ r_i$ on the rigid body B so that the respective sensing direction s may be $^\circ u_i$ (i=1,2, . . . n), the relationship expressed by the following equation 9 is derived from the equation 7:

$$a = {}^{\circ}R \begin{bmatrix} {}^{\circ}\ddot{p}_b \\ {}^{\circ}\dot{\omega}_b \end{bmatrix} + \begin{bmatrix} {}^{\circ}u_1^T\{{}^{\circ}\omega_b \times ({}^{\circ}\omega_b \times {}^{\circ}r_1)\} \\ {}^{\circ}u_2^T\{{}^{\circ}\omega_b \times ({}^{\circ}\omega_b \times {}^{\circ}r_2)\} \\ \vdots \\ {}^{\circ}u_n^T\{{}^{\circ}\omega_b \times ({}^{\circ}\omega_b \times {}^{\circ}r_n)\} \end{bmatrix} \quad \text{Equation 9}$$

In the above equation 9, one-axis acceleration "a" and matrix °R can be expressed by the following equation 10:

$$a = [a_1 \ a_2 \ \cdots \ a_n]^T, \quad \text{Equation 10}$$

$${}^{\circ}R = \begin{bmatrix} {}^{\circ}u_1^T - {}^{\circ}u_1^T{}^{\circ}R_1 \\ {}^{\circ}u_2^T - {}^{\circ}u_2^T{}^{\circ}R_2 \\ \vdots \\ {}^{\circ}u_n^T - {}^{\circ}u_n^T{}^{\circ}R_n \end{bmatrix}, i = 1, 2 \ldots, n$$

6 DOF acceleration of the rigid body B can be given by a term shown by the following equation or formula 11:

$$[{}^{\circ}\ddot{p}_b{}^T {}^{\circ}\dot{\omega}_b{}^T]^T \quad \text{Equation 11}$$

Accordingly, by the above equation 9 is given a condition for the aforesaid one-axis acceleration "a" to extend in a six-dimensional space, as shown by the following equation 12:

$$\text{rank } {}^{\circ}R = 6 \quad \text{Equation 12}$$

Particularly, when n=6 and rank °R=6, i.e., when the matrix °R is regular, 6 DOF acceleration of the rigid body B shown by the formula 11 can be determined with uniqueness through the equation 9. Accordingly, it will be assumed hereinafter that n=6 and the matrix °R is regular. In such case, the following equation 13 holds:

$$\begin{bmatrix} {}^{\circ}\ddot{p}_b \\ {}^{\circ}\dot{\omega}_b \end{bmatrix} = {}^{\circ}R^{-1} \begin{bmatrix} a_1 - {}^{\circ}u_1^T\{{}^{\circ}\omega_b \times ({}^{\circ}\omega_b \times {}^{\circ}r_1)\} \\ a_2 - {}^{\circ}u_2^T\{{}^{\circ}\omega_b \times ({}^{\circ}\omega_b \times {}^{\circ}r_2)\} \\ \vdots \\ a_6 - {}^{\circ}u_6^T\{{}^{\circ}\omega_b \times ({}^{\circ}\omega_b \times {}^{\circ}r_n)\} \end{bmatrix} \quad \text{Equation 13}$$

As is apparent from the equation 9, the regularity of the matrix °R depends upon the six uni-directional accelerometers' positions °$r_i$ and sensing directions °$u_i$ with respect to the rigid body B.

In the meantime, whilst the equation 13 indicates the result according to the rest frame Σo, it is often more convenient to express the same according to the coordinate system Σb fixed to a vehicle, when the device of the invention is used for a vehicle. Accordingly, if a coordinate system transformation (rotation) matrix for transforming from the coordinate system Σb to the standard coordinate system Σo is denoted by °$A_b$, then the foregoing equation 6 can be expressed by the following equation 14:

$$a_1 = ({}^{\circ}A_b{}^b u_i)^T ({}^{\circ}A_b{}^b \ddot{p}_i) \quad \text{Equation 14}$$

$$= {}^b u_i^T {}^b \ddot{p}_i$$

After transforming the equation 5 and etc. in the similar manner and then arranging thus obtained results, the following equation 15 is given:

$$\begin{bmatrix} {}^{\circ}\ddot{p}_b \\ {}^{\circ}\dot{\omega}_b \end{bmatrix} = {}^b R^{-1} \begin{bmatrix} a_1 - {}^b u_1^T\{{}^b\omega_b \times ({}^b\omega_b \times {}^b r_1)\} \\ a_2 - {}^b u_2^T\{{}^b\omega_b \times ({}^b\omega_b \times {}^b r_2)\} \\ \vdots \\ a_6 - {}^b u_6^T\{{}^b\omega_b \times ({}^b\omega_b \times {}^b r_n)\} \end{bmatrix} \quad \text{Equation 15}$$

The 6-axis acceleration measuring method using six one-axis uni-directional accelerometers (n=6) can be expressed theoretically as follows.

Namely, for the equation 13 to hold true, the six one-axis uni-directional accelerometers should be disposed in a manner that the matrix °R becomes regular, as above described. Also, the matrix °R is able to be transformed into the following equations 16 and 17:

$${}^{\circ}R = {}^{\circ}A_b{}^b R \quad \text{Equation 16}$$

$${}^b R = {}^b U {}^b R, \quad \text{Equation 17}$$

Where the ${}^b U$ and ${}^b R$ in the above equations 16 and 17 can be expressed by the following equation 18:

$${}^b U = \begin{bmatrix} {}^b u_1^T & 0_3 & 0_3 & 0_3 & 0_3 & 0_3 \\ 0_3 & {}^b u_2^T & 0_3 & 0_3 & 0_3 & 0_3 \\ & & \vdots & & & \\ 0_3 & 0_3 & 0_3 & 0_3 & 0_3 & {}^b u_6^T \end{bmatrix} \quad \text{Equation 18}$$

$$0_3 = [0 \ 0 \ 0],$$

$${}^b R = \begin{bmatrix} I_3 & -{}^b R_1 \\ I_3 & -{}^b R_2 \\ \vdots & \vdots \\ \vdots & \vdots \\ I_3 & -{}^b R_6 \end{bmatrix}$$

For the equation 16 to satisfy the condition defined by the equation 12, ${}^b R$ should become regular, as °$A_b$ is regular. As rank ${}^b U = 6$ in the equation 17, at least the following equation 19 must hold.

$$\text{rank } {}^b R = 6 \quad \text{Equation 19}$$

Taking the following equation 20 into consideration, at least three of from ${}^b R1$ through ${}^b R6$ must not be the same.

$$\text{rank}[(I_3 - {}^b R_1)^T (I_3 - {}^b R_j)^T]^T \leq 5, (i,j=1,2,\ldots,6, i \neq j) \quad \text{Equation 20}$$

In other words, this supports the reason why the six one-axis uni-directional accelerometers 1 through 6 must be mounted to at least three different positions.

Although a variety of positions of the six one-axis uni-directional accelerometers 1 through 6 may meet the above condition to make the matrix R regular, they are desirably disposed, from a practical point of view, such as easy manufacture, as follows: 1) disposing all the one-axis uni-directional accelerometers 1 through 6 on the same plane (which results in a simple structure); 2) mounting as many accelerometers as possible to the same position.

Figure 2:
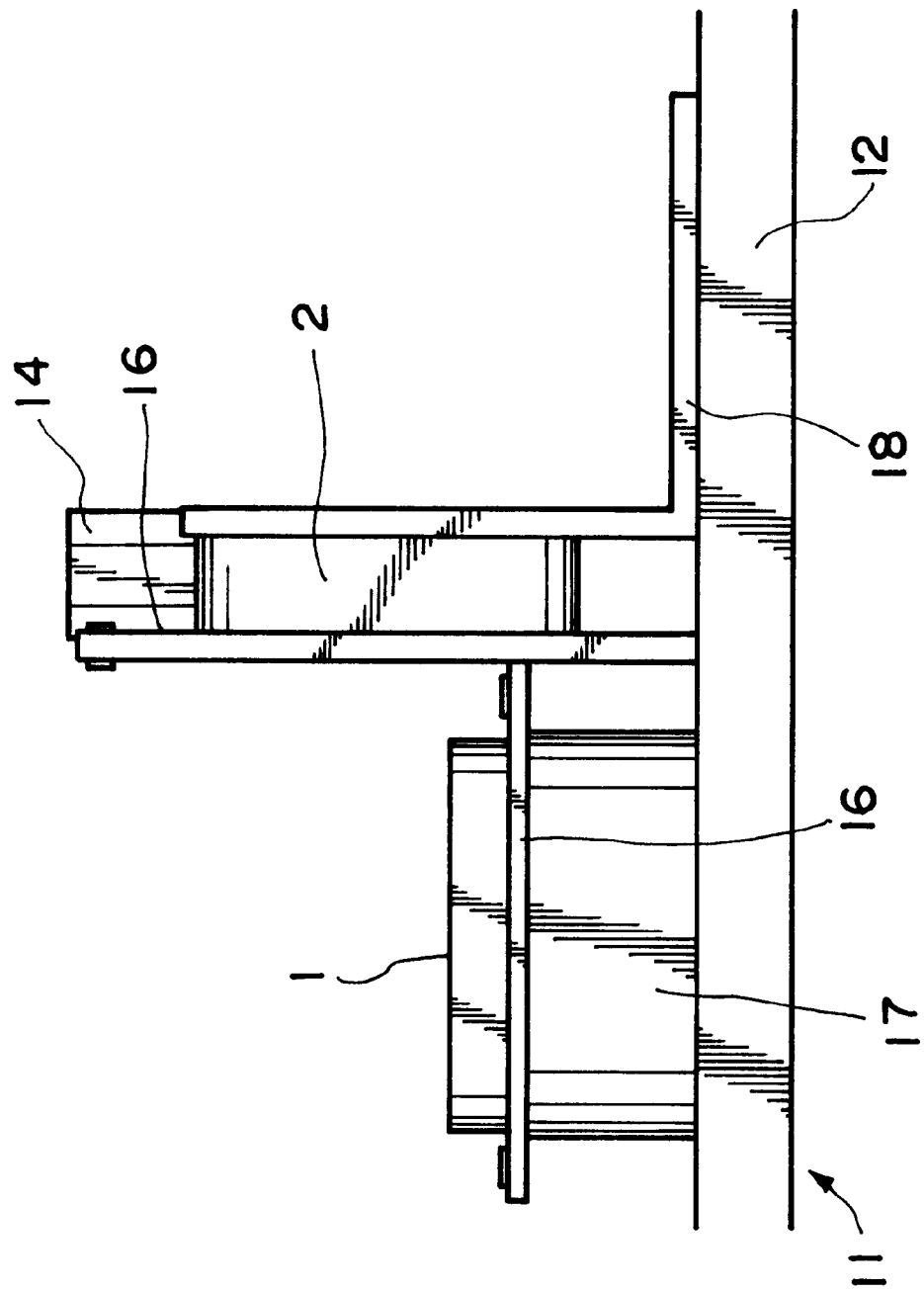
FIG. 2 is a front view showing a main part of the detector body as shown in FIG. 1.
Figure 5:
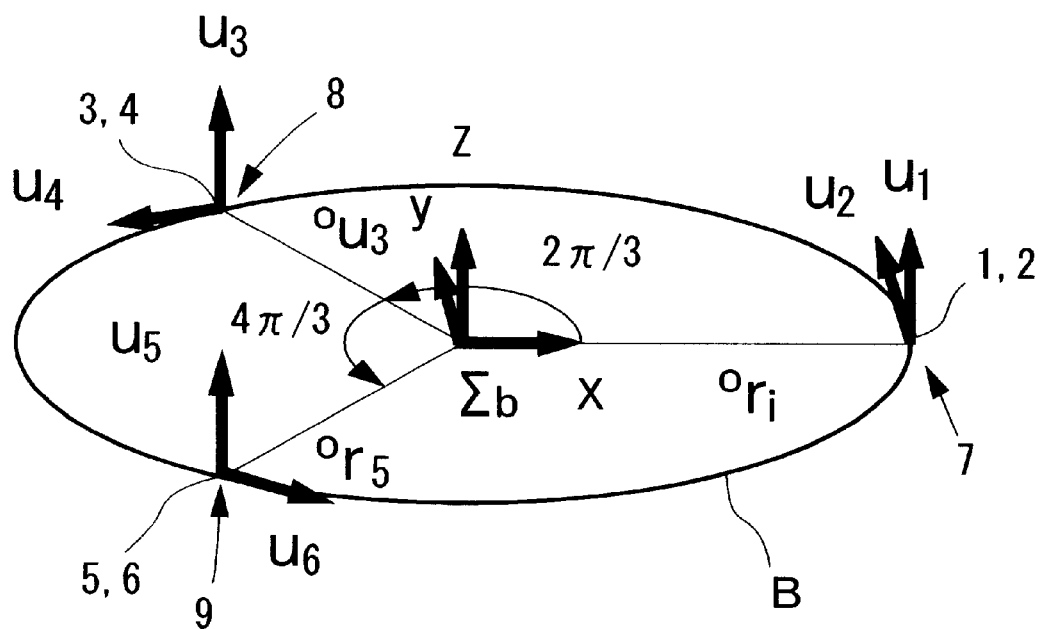
FIG. 5 is a schematic explanatory diagram illustrating a case where several accelerometers are disposed on a desirable position on a rigid body.

FIGS. 1 and 5 illustrate an example of a preferred disposition of the one-axis uni-directional accelerometers 1 through 6 which meets such desirable conditions. In this case, the origin of the coordinate system Σb is set on an arbitrary point on the rigid body B, and then, each pair of the accelerometers is disposed every 120 degrees on the same plane around the origin of the coordinate system Σb. At this time, matrix $^bR$ is given by the following equation 21:

$$^bR = \begin{bmatrix} 0 & 0 & 1 & 0 & -r & 0 \\ 0 & 1 & 0 & 0 & 0 & r \\ 0 & 0 & 1 & \sqrt{3}r/2 & r/2 & 0 \\ -\sqrt{3}/2 & -1/2 & 0 & 0 & 0 & r \\ 0 & 0 & 1 & -\sqrt{3}r/2 & r/2 & 0 \\ \sqrt{3}/2 & -1/2 & 0 & 0 & 0 & r \end{bmatrix} \quad \text{Equation 21}$$

It is to be noted that the matrix $^bR$ is regular, of which the inverse matrix is given by the following equation 22:

$$^bR^{-1} = \quad \text{Equation 22}$$

$$\begin{bmatrix} 0 & 0 & 0 & -1/\sqrt{3} & 0 & 1/\sqrt{3} \\ 0 & 2/3 & 0 & -1/3 & 0 & -1/3 \\ 1/3 & 0 & 1/3 & 0 & 1/3 & 0 \\ 0 & 0 & 1/\sqrt{3}r & 0 & -1/\sqrt{3}r & 0 \\ -2/3r & 0 & 1/3r & 0 & 1/3r & 0 \\ 0 & 1/3r & 0 & 1/3r & 0 & 1/3r \end{bmatrix}$$

Namely, according to the foregoing embodiment of the invention, as least six one-axis uni-directional accelerometers 1 through 6 are mounted to three or more different positions on the same plane on the rigid body B to be measured, thus obtaining acceleration signals a1 through a6 which are output from each of the accelerometers 1 through 6, which is then followed by the processing expressed by the equation 13, using thus obtained acceleration signals a1 through a6 in order to separate centrifugal and angular effects involved in each one-axis uni-directional acceleration, whereby the 6-axis acceleration of the rigid body B is measured, with noticeable accuracy of measurement of the 6-axis acceleration as well as the motion of the rigid body B.

In the meantime, the above equation 13 includes the term of angular velocity °ωb which is non-linear, and thus it is practically difficult to carry out the measurement with only the respective measured vectors "a" from the one-axis uni-directional accelerometers 1 through 6. Further, for computing process by the processing unit 21, a discrete measurement equation is more convenient, and thus a discrete recurrence formula for processing the above non-linear term of angular velocity °ωb as well, must be given.

If sampling intervals of data obtained from each of the one-axis uni-directional accelerometers 1 through 6 are denoted as Δt (second), and the nth sampling value of the above measured vectors "a" denoted as a(n), then the equation 13 can be expressed by the following equation 23:

$$\begin{bmatrix} °\ddot{p}_b(n) \\ °\dot{\omega}_b(n) \end{bmatrix} = °R^{-1}(n)\{a(n) - f(n)\} \quad \text{Equation 23}$$

where the f(n) is expressed by the following equation 24:

$$f(n) = \begin{bmatrix} °u_1^T(n)\{°\omega_b(n) \times (°\omega_b(n) \times °r_1(n))\} \\ °u_2^T(n)\{°\omega_b(n) \times (°\omega_b(n) \times °r_2(n))\} \\ \vdots \\ °u_n^T(n)\{°\omega_b(n) \times (°\omega_b(n) \times °r_n(n))\} \end{bmatrix} \quad \text{Equation 24}$$

Here, the above equation 23 needs °ωb(n) to calculate the following terms shown in equation 25 given below:

$$°R^{-1}(n) \text{ and } f(n) \quad \text{Equation 25}$$

Hence, the relationship defined by the following equation 26 is used, while for respective terms in equation 27 are used the (n−1)th values.

$$°\omega_b(n) = °\omega_b(n-1) + °\dot{\omega}_b(n)\Delta t \quad \text{Equation 26}$$

$$f(n), °u_i(n), °r_i(n), i=1,2,\ldots,6 °\omega_b(n) \quad \text{Equation 27}$$

That is, the equation 23 can be expressed by the following equations 28 and 29:

$$\begin{bmatrix} °\ddot{p}_b(n) \\ °\dot{\omega}_b(n) \end{bmatrix} = °R^{-1}(n-1)\{a(n) - f(n-1)\} \quad \text{Equation 28}$$

$$\begin{bmatrix} °\dot{p}_b(n) \\ °\omega_b(n) \end{bmatrix} = \begin{bmatrix} °\dot{p}_b(n-1) \\ °\omega_b(n-1) \end{bmatrix} + \begin{bmatrix} °\ddot{p}_b(n) \\ °\dot{\omega}_b(n) \end{bmatrix} \Delta t \quad \text{Equation 29}$$

Using these equations 28 and 29 requires initial values $°p_b(1)$ and $°\omega_b(1)$, at t=0 (n=1), but each may be a value shown in the following equation 30 for a vehicle or the like.

$$\text{When } t=0, °\dot{p}_b(1)=°\omega_b(1)=0 \quad \text{Equation 30}$$

Thus, by recording acceleration signals from each of the one-axis uni-directional accelerometers 1–6 at specific time intervals, the 6-axis acceleration of the rigid body B can be measured successively using the equations 28, 29 and 30.

Figure 6:
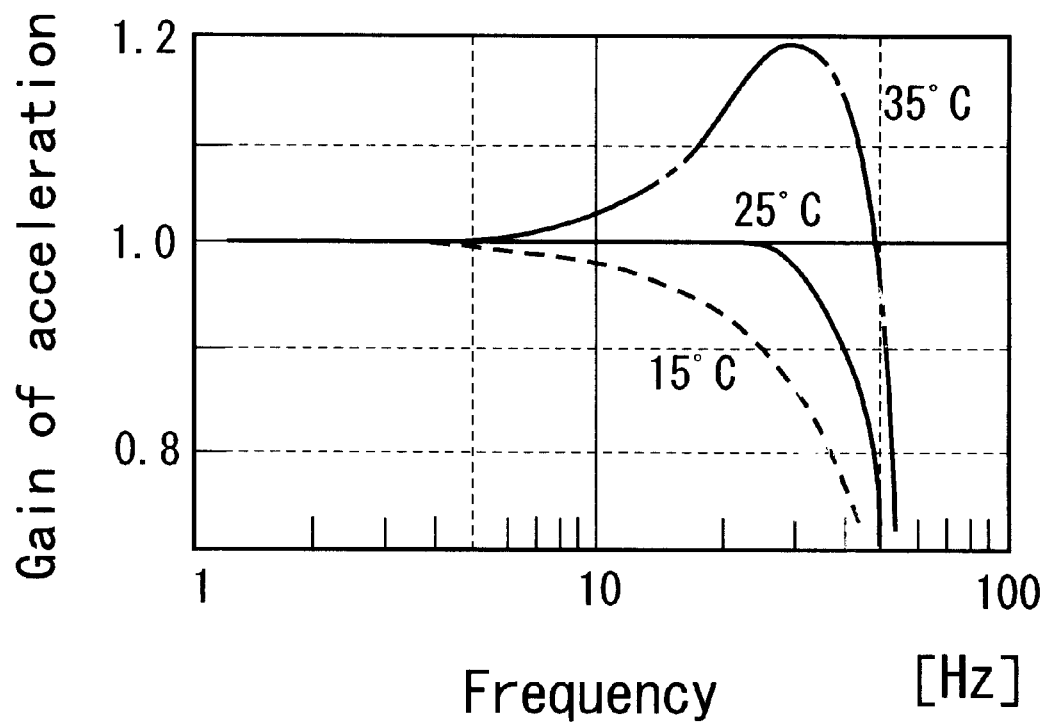
FIG. 6 is a graph showing the frequency-acceleration output gain characteristics of a one-axis uni-directional accelerometer of the invention.

Hereinafter is described an example of an experiment where a 6 DOF motion measurement method and a device therefor according to the embodiment of the invention were employed for measuring the 6-axis acceleration of a vehicle in motion. In the present embodiment, each of the one-axis uni-directional accelerometers 1–6 is disposed in a manner that each detector portion 7 to 9 is located at an apex of an equilateral triangle, as shown in FIGS. 1 and 5. In the equations 21 and 22, the mounting position of each of the detector portions 7 to 9 is set at r=250 mm, while the six one-axis uni-directional accelerometers 1 to 6 are each of strain-gauge type, displaying uniform characteristic (rated to ±2 g). FIG. 6 shows the response characteristic of the uni-directional accelerometers 1 to 6 with respect to temperature. As silicone oil was used here as a damping material for the one-axis uni-directional accelerometers 1 to 6, the response characteristic slightly varied, depending on ambient temperature, which, however, was found flat up to a range of DC 30 Hz at ambient temperature of 25° C. Specifically, when incorporating the measurement device of the invention into a vehicle, it is desirable to use the one-axis uni-directional accelerometers 1 to 6 of such characteristic, as the movement of the vehicle in motion can be accurately measured with a sufficient band width.

12 bit A/D conversion was performed at sampling rate of 60 Hz, relative to the acceleration measurement signals from each of the one-axis uni-directional accelerometers 1 to 6, which were then taken in the processing unit 21 or personal computer to carry out the processing based on the equations 28 and 29, whereby the 6-axis accelerations were measured successively. In the meantime, the above sampling rate should be suitably determined, in view of the characteristics of the respective one-axis uni-directional accelerometers 1 to 6 and an object to be measured. The characteristic of the measurement device depends on the characteristic of each uni-directional accelerometer 1 through 6 and the characteristic defined by the equation 28. The characteristic of the one-axis uni-directional accelerometers 1 to 6 according the embodiment is such that the rated acceleration is 20 m/s$^2$ in terms of linear acceleration, and 80 rad/s$^2$ in terms of angular acceleration, while the resolution is 0.01 m/s$^2$ in terms of linear acceleration, and 0.02 rad/s$^2$ in terms of angular acceleration, respectively.

As is apparent from the equations 19, 28 and so on, the sensitivity of linear acceleration depends on the respective characteristic of the one-axis uni-directional accelerometers 1 to 6. For the sensitivity relative to rotational direction, however, it is adjustable by the aforesaid "r". As an object to be measured is a vehicle in this example, its characteristic was taken into consideration, such that the mounting position "r" of the one-axis uni-directional accelerometers 1 to 6 was set at 250 mm as above mentioned.

Then, the measurement device according to the embodiment was mounted on a vehicle, and then the motion of the vehicle travelling on a highway was measured. The detector body 11 was fixedly mounted to under the driver's assistant seat, while a conventional measurement device was mounted to the center console (or substantially the center of gravity) of the vehicle for comparison. The conventional measurement device meant here is a one which comprises a strain-gauge type three-axis-fused accelerometer of ±2 g rated sensitivity (i.e., the one where three of the one-axis uni-directional accelerometers 1 to 6 of the embodiment were combined together), and three one-axis mechanical rate gyroscopes with a rated sensitivity of ±20 deg/s (each having a built-in low pass filter of about 10 Hz) combined together.

Figure 7:
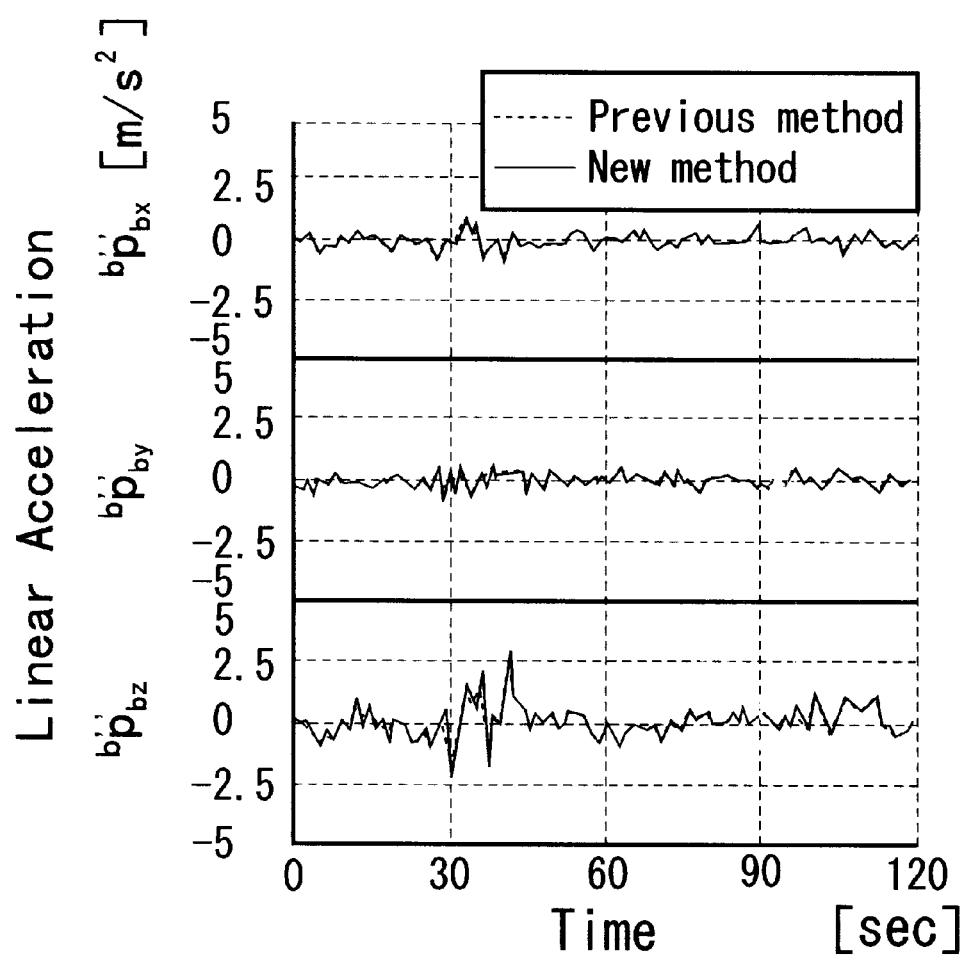
FIG. 7 is a graph showing the linear acceleration characteristics comparing between a conventional measurement device and a measurement device according to the invention.
Figure 8:
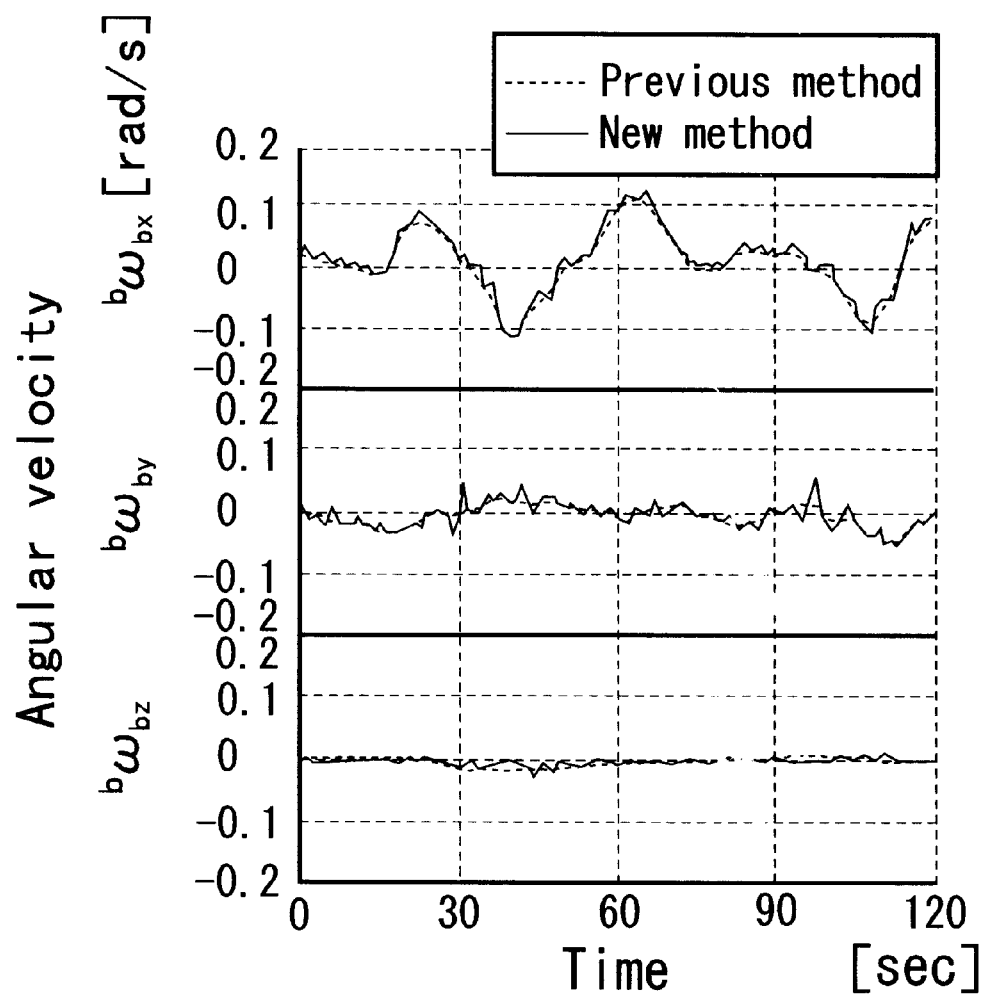
FIG. 8 is a graph showing the angular velocity characteristics comparing between a conventional measurement device and a measurement device according to the invention.

FIGS. 7 and 8 each show a graph of the comparison of the measurement result between the measurement device of the embodiment and the conventional one. In the meantime, although the effects of angular velocity indicated by the equation 5 are included through the conventional measurement device also, the measurement results shown in FIGS. 7 and 8 remain un-corrected. Whilst, as the processing using the equations 28 and 29 were performed in the measurement device of the embodiment, attention was paid therein to separate the angular effects.

For the linear acceleration shown in FIG. 7, there can be noted slight differences between the measurement device of the embodiment and the conventional one. These slight differences presumably resulted from whether the aforesaid effects of angular velocity were taken into consideration or not. For the angular velocity shown in FIG. 8, more high frequency components seem to be included through the measurement device of the embodiment.

Then, the measurement data shown in FIGS. 7 and 8 were fast Fourier transformed (FFT) by the processing unit 21, and then power spectrum density was calculated, thus obtaining results shown in FIGS. 9 and 10. For the linear acceleration shown in FIG. 9, there can be noted substantially no differences in measurement result between the measurement device of the embodiment and the conventional one. This is presumably due to the fact that both measurement devices use substantially the same accelerometers with respect to the linear direction. For the rotational direction shown in FIG. 10, there can be noted an inclination for the frequency components of the conventional one to decrease by a few Hz or more, which is presumably due to the influence by the low pass filter built in the rate gyroscope.

Incidentally, as the present embodiment requires the numerical integration as shown by the equation 26, errors are accumulated due to the drift of each of the one-axis uni-directional accelerometers 1 to 6. For the rigid body B such as a vehicle which normally does not make a continuous rotational movement, however, such drift errors can be reduced to a considerable extent, by incorporating an indefinite integration having a high pass characteristic of about 10 sec. time constant into the processing by the processing unit 21, instead of the numerical integration by the equation 26.

As seen from the foregoing, as each of the one-axis uni-directional accelerometers 1 to 6 is structured in a manner fixed to the rigid body B through the base 12 in this embodiment, no Coriolis force will be developed even when an external force is applied to the rigid body B. Accordingly, the processing by the processing unit 21 at the later stage can be carried out without being affected by the Coriolis force. Further, with at least 6 one-axis uni-directional accelerometers 1 to 6 located at three or more different positions relative to the rigid body B, the matrix °Ri showing the position vector of each of the one-axis uni-directional accelerometers 1 to 6 with respect to the directions of X,Y and Z axes becomes regular in theory, and thus the equation 13 holds, thus enabling the processing unit 21 to perform the processing with the effects by the centrifugal acceleration and the angular acceleration included in each one-axis uni-directional accelerometer being separated therefrom. Furthermore, as the processing can be carried out, using the acceleration signals from the respective 6 one-axis uni-directional accelerometer 1 to 6 only, you are free from any concerns about the low response characteristic, the different phase characteristics and the like, which would go together with the conventional one having rate gyroscopes combined therewith.

Moreover, as the one-axis uni-directional accelerometers 1 to 6 are mounted not three-dimensionally, but on the same plane, you have only to consider a two-dimensional positional relationship among the accelerometers 1 to 6 for realizing the accurate arrangement thereof, and thus, the motion of the rigid body B (acceleration, angular velocity and angular acceleration) can be measured very accurately with such simple arrangement.

In other words, if a 6 DOF motion of the rigid body B is measured in such a manner that at least 6 one-axis uni-directional accelerometers 1 to 6 are fixed to three or more different positions on the same plane as that of a rigid body B, then carrying out the processing , using acceleration signals output from each of the one-axis uni-directional accelerometers 1 to 6 so that centrifugal and angular effects included in each one-axis uni-directional accelerometer may be separated therefrom, there can be provided a method for accurately measuring a 6 DOF motion of the rigid body B, using the least possible accelerometers and the simple arrangement thereof.

Also, if a measurement device comprises: at least 6 one-axis uni-directional accelerometers 1 to 6 fixed to three or more different positions on the same plane as that of a rigid body B; and a processing unit for processing so as to separate centrifugal and angular effects included in each of the one-axis uni-directional accelerometer 1 to 6, then there can be provided a device for accurately measuring a 6 DOF motion of the rigid body B, using the least possible accelerometers and the simple arrangement thereof.

Alternatively, there may be provided seven or more one-axis uni-directional accelerometers. It should be noted that as the number of the one-axis uni-directional accelerometers increases, the effects of noises included therein will be lessened, so that the measurement accuracy will be improved. In theory, however, at least six one-axis uni-directional accelerometers would suffice. It should also be noted that for the separation of the centrifugal and angular effects, the respective sensing directions $°u_i$ of the three or more one-axis uni-directional accelerometers 1 to 6 must not be either on the same straight line, or intersect one another at the same point.

Although the characteristics of the one-axis uni-directional accelerometers does not need to be uniform, the uniform characteristic would be preferred as it can realize the uniform response characteristic relative to each direction of degree of freedom. With such uniform characteristic, interference between each degree of freedom can be removed, thus obtaining 6-axis acceleration or angular acceleration with respect to any coordinate system. Further, the one-axis uni-directional accelerometers 1 to 6 can be calibrated comparatively easily, using the gravitational acceleration.

Utilizing the above-mentioned features enables a measurement method and device according to the invention to be used not only for measurement of a motion of a robot, parallel manipulator, vehicle and the like, but also for advanced control system, using 6-axis acceleration. Furthermore, as the one-axis uni-directional accelerometers 1 to 6 of the embodiment are structured by providing sensors and various types of signal conditioners on the same silicone tip, the measuring method and device can be supplied at extremely low costs. Thus, a measurement method and device according to the invention can be effectively used for practical use in various fields.

What is claimed:

1. A method for measuring a 6 DOF motion of a rigid body, which comprises the steps of:

fixing at least six one-axis uni-directional accelerometers to three or more different positions on the same plane as that of a rigid body; and carrying out processing, using acceleration signals output from each of the one-axis uni-directional accelerometers so that the effects of centrifugal acceleration and rotational angular acceleration included in each one-axis uni-directional accelerometer may be separated therefrom.

2. A method for measuring a 6 DOF motion of a rigid body according to claim 1, wherein the one-axis uni-directional accelerometers are mounted to arbitrary positions denoted by position vector $°r_i$ on the rigid body so that vectors in the sensing directions may become $°u_i$ (i=1,2, . . . n, its left affix indicating a coordinate system to which the vector belongs), whereby a 6 degrees of freedom acceleration of the rigid body in a static coordinate standard system Σo shown by the following equation:

$$[°\ddot{p}b^T °\dot{\omega}b^T]^T$$

is calculated, based on the following equation:

$$a = °R \begin{bmatrix} °\ddot{p}_b \\ °\dot{\omega}_b \end{bmatrix} + \begin{bmatrix} °u_1^T \{°\omega_b \times (°\omega_b \times °r_1)\} \\ °u_2^T \{°\omega_b \times (°\omega_b \times °r_2)\} \\ \vdots \\ °u_n^T \{°\omega_b \times (°\omega_b \times °r_n)\} \end{bmatrix}$$

where the $°p_b$ indicates the position of the origin of a coordinate system Σb fixed to the rigid body as viewed from the static coordinate standard system Σo, and the $°\omega_b$ indicates an angular velocity of the rigid body rotating around the origin of the coordinate system Σb, while the one-axis acceleration "a" and the matrix $°R$ are expressed by the following equations, respectively:

$$a = [a_1 \ a_2 \ \ldots \ a_n]^T,$$

$$°R = \begin{bmatrix} °u_1^T & -°u_1^T °R_1 \\ °u_1^T & -°u_1^T °R_2 \\ \vdots \\ °u_n^T & -°u_n^T °R_n \end{bmatrix}, i = 1, 2, \ldots, n$$

$$°R_i = \begin{bmatrix} 0 & -°r_{iz} & °r_{iy} \\ °r_{iz} & 0 & -°r_{ix} \\ -°r_{iy} & °r_{ix} & 0 \end{bmatrix}$$

3. A method for measuring a 6 DOF motion of a rigid body according to claim 2, wherein the number (n) of said one-axis uni-directional accelerometers is six, while the said one-axis uni-directional accelerometers are arranged so that the matrix $°R$ may become regular, whereby a 6 degrees of freedom acceleration of the rigid body in the static coordinate standard system Σo shown by the following equation:

$$[°\ddot{p}b^T °\dot{\omega}b^T]^T$$

is calculated, based on the following equation:

$$\begin{bmatrix} °\ddot{p}_b \\ °\dot{\omega}_b \end{bmatrix} = °R^{-1} \begin{bmatrix} a_1 - °u_1^T \{°\omega_b \times (°\omega_b \times °r_1)\} \\ a_2 - °u_2^T \{°\omega_b \times (°\omega_b \times °r_2)\} \\ \vdots \\ a_6 - °u_6^T \{°\omega_b \times (°\omega_b \times °r_n)\} \end{bmatrix}$$

4. A method for measuring a 6 DOF motion according to claim 3, wherein a 6 degrees of freedom acceleration of the rigid body in the coordinate system Σb fixed to the rigid body is calculated based on the following equation:

$$\begin{bmatrix} °\ddot{p}_b \\ °\dot{\omega}_b \end{bmatrix} = {}^b R^{-1} \begin{bmatrix} a_1 - {}^b u_1^T \{{}^b\omega_b \times ({}^b\omega_b \times {}^b r_1)\} \\ a_2 - {}^b u_2^T \{{}^b\omega_b \times ({}^b\omega_b \times {}^b r_2)\} \\ \vdots \\ a_6 - {}^b u_6^T \{{}^b\omega_b \times ({}^b\omega_b \times {}^b r_n)\} \end{bmatrix}$$

5. A method for measuring a 6 DOF motion according to claim 3, wherein data from each one-axis uni-directional accelerometer are obtained at sampling intervals of Δt (second), whereby a 6 degrees of freedom acceleration of the rigid body in the static coordinate standard system To shown by the following equation:

$$[°\ddot{p}b^T °\dot{\omega}b^T]^T$$

is calculated based on the following equations:

$$\begin{bmatrix} {}^\circ\ddot{p}_b(n) \\ {}^\circ\dot{\omega}_b(n) \end{bmatrix} = {}^\circ R^{-1}(n-1)\{a(n) - f(n-1)\}$$

where a(n) indicates the nth sampling value of measured value vector, and $$\begin{bmatrix} {}^\circ\dot{p}_b(n) \\ {}^\circ\omega_b(n) \end{bmatrix} = \begin{bmatrix} {}^\circ\dot{p}_b(n-1) \\ {}^\circ\omega_b(n-1) \end{bmatrix} + \begin{bmatrix} {}^\circ\ddot{p}_b(n) \\ {}^\circ\dot{\omega}_b(n) \end{bmatrix} \Delta t$$

where

When t=0, ${}^\circ\dot{p}b(1) = {}^\circ\omega b(1) = 0$ $$f(n) = \begin{bmatrix} {}^\circ u_1^T(n)\{{}^\circ\omega_b(n) \times ({}^\circ\omega_b(n) \times {}^\circ r_1(n))\} \\ {}^\circ u_2^T(n)\{{}^\circ\omega_b(n) \times ({}^\circ\omega_b(n) \times {}^\circ r_2(n))\} \\ \vdots \\ {}^\circ u_n^T(n)\{{}^\circ\omega_b(n) \times ({}^\circ\omega_b(n) \times {}^\circ r_n(n))\} \end{bmatrix}$$

6. A method for measuring a 6 DOF motion according to claim 1, wherein the frequency response characteristic and phase characteristic of each one-axis uni-directional accelerometer is uniform.

7. A method for measuring a 6 DOF motion according to claim 1, wherein the one-axis uni-directional accelerometers are paired respectively, disposed close to one another nearly on the same position, in which a first one of each pair of one-axis uni-directional accelerometers has a sensing direction directed to the Z-axis, while the second one of each pair of uni-directional accelerometers has a sensing direction parallel to the X-Y plane, with the height of the first one of each pair of one-axis uni-directional accelerometers aligned to the center of the second one of each pair of one-axis uni-directional accelerometers.

8. A device for measuring a 6 DOF motion of a rigid body, which comprises:

at least six one-axis uni-directional accelerometers fixed to three or more different positions on the same plane as that of a rigid body; and a processing unit for calculating the 6 DOF motion of the rigid body, said processing unit carrying out processing, using acceleration signals output from each of the one-axis uni-directional accelerometers so that the effects of centrifugal acceleration and rotational angular acceleration included in each one-axis uni-directional accelerometer may be separated therefrom.

9. A device for measuring a 6 DOF motion of a rigid body according to claim 8, wherein the one-axis uni-directional accelerometers are mounted to arbitrary positions denoted by position vector ${}^\circ r_i$ on the rigid body so that vectors in the sensing directions may become ${}^\circ u_i$ (i=1,2, ... n, its left affix indicating a coordinate system to which the vector belongs), whereby a 6 degrees of freedom acceleration of the rigid body in a static coordinate standard system $\Sigma$o shown by the following equation:

$$[{}^\circ\ddot{p}b^T \, {}^\circ\dot{\omega}b^T]^T$$

is calculated by said processing unit, based on the following equation:

$$a = {}^\circ R \begin{bmatrix} {}^\circ\ddot{p}_b \\ {}^\circ\dot{\omega}_b \end{bmatrix} + \begin{bmatrix} {}^\circ u_1^T\{{}^\circ\omega_b \times ({}^\circ\omega_b \times {}^\circ r_1)\} \\ {}^\circ u_2^T\{{}^\circ\omega_b \times ({}^\circ\omega_b \times {}^\circ r_2)\} \\ \vdots \\ {}^\circ u_n^T\{{}^\circ\omega_b \times ({}^\circ\omega_b \times {}^\circ r_n)\} \end{bmatrix}$$

where the °pb indicates the position of the origin of a coordinate system $\Sigma$b fixed to the rigid body as viewed from the static coordinate standard system $\Sigma$o, and the °ωb indicates an angular velocity of the rigid body rotating around the origin of the coordinate system $\Sigma$b, while the one-axis acceleration "a" and the matrix °R are expressed by the following equations, respectively:

$$a = [a_1 \; a_2 \; \cdots \; a_n]^T,$$

$$^\circ R = \begin{bmatrix} [{}^\circ u_1^T - {}^\circ u_1^T {}^\circ R_1] \\ [{}^\circ u_2^T - {}^\circ u_1^T {}^\circ R_2] \\ \vdots \\ [{}^\circ u_n^T - {}^\circ u_1^T {}^\circ R_n] \end{bmatrix}, i = 1, 2 \ldots, n$$

$$^\circ R_i \begin{bmatrix} 0 & -{}^\circ r_{iz} & {}^\circ r_{iy} \\ {}^\circ r_{iz} & 0 & -{}^\circ r_{ix} \\ -{}^\circ r_{iy} & {}^\circ r_{ix} & 0 \end{bmatrix}.$$

10. A device for measuring a 6 DOF motion of a rigid body according to claim 9, wherein the number (n) of said one-axis uni-directional accelerometers is six, while the said one-axis uni-directional accelerometers are arranged so that the matrix °R may become regular, whereby a 6 degrees of freedom acceleration of the rigid body in the static coordinate standard system $\Sigma$o shown by the following equation:

$$[{}^\circ\ddot{p}b^T \, {}^\circ\dot{\omega}b^T]^T$$

is calculated by said processing unit, based on the following equation:

$$\begin{bmatrix} {}^\circ\ddot{p}_b \\ {}^\circ\dot{\omega}_b \end{bmatrix} = {}^\circ R^{-1} \begin{bmatrix} a_1 - {}^\circ u_1^T\{{}^\circ\omega_b \times ({}^\circ\omega_b \times {}^\circ r_1)\} \\ a_2 - {}^\circ u_2^T\{{}^\circ\omega_b \times ({}^\circ\omega_b \times {}^\circ r_2)\} \\ \vdots \\ a_6 - {}^\circ u_6^T\{{}^\circ\omega_b \times ({}^\circ\omega_b \times {}^\circ r_n)\} \end{bmatrix}.$$

11. A device for measuring a 6 DOF motion according to claim 10, wherein a 6 degrees of freedom acceleration of the rigid body in the coordinate system $\Sigma$b fixed to the rigid body is calculated by said processing unit based on the following equation:

$$\begin{bmatrix} {}^\circ\ddot{p}_b \\ {}^\circ\dot{\omega}_b \end{bmatrix} = {}^b R^{-1} \begin{bmatrix} a_1 - {}^b u_1^T\{{}^b\omega_b \times ({}^b\omega_b \times {}^b r_1)\} \\ a_2 - {}^b u_2^T\{{}^b\omega_b \times ({}^b\omega_b \times {}^b r_2)\} \\ \vdots \\ a_6 - {}^b u_6^T\{{}^b\omega_b \times ({}^b\omega_b \times {}^b r_n)\} \end{bmatrix}.$$

12. A device for measuring a 6 DOF motion according to claim 10, wherein said processing unit obtains data from each one-axis uni-directional accelerometer at sampling intervals of $\Delta t$ (second), whereby a 6 degrees of freedom acceleration of the rigid body in the static coordinate standard system Σo shown by the following equation:

$$[°\ddot{p}b^T °\dot{\omega}b^T]^T$$

is calculated by said processing unit, based on the following equations:

$$\begin{bmatrix} °\ddot{p}_b(n) \\ °\dot{\omega}_b(n) \end{bmatrix} = °R^{-1}(n-1)\{a(n) - f(n-1)\}$$

where a(n) indicates the nth sampling value of measured value vector $$\begin{bmatrix} °\dot{p}_b(n) \\ °\omega_b(n) \end{bmatrix} = \begin{bmatrix} °\dot{p}_b(n-1) \\ °\omega_b(n-1) \end{bmatrix} + \begin{bmatrix} °\ddot{p}_b(n) \\ °\dot{\omega}_b(n) \end{bmatrix} \Delta t$$

where

When t=0, $°\dot{p}b(1) = °\omega b(1) = 0$ $$f(n) = \begin{bmatrix} °u_1^T(n)\{°\omega_b(n) \times (°\omega_b(n) \times °r_1(n))\} \\ °u_2^T(n)\{°\omega_b(n) \times (°\omega_b(n) \times °r_2(n))\} \\ \vdots \\ °u_n^T(n)\{°\omega_b(n) \times (°\omega_b(n) \times °r_n(n))\} \end{bmatrix}.$$

13. A device for measuring a 6 DOF motion according to claim 8, wherein the frequency response characteristic and phase characteristic of each one-axis uni-directional accelerometer is uniform.

14. A device for measuring a 6 DOF motion according to claim 8, wherein the one-axis uni-directional accelerometers are paired respectively, disposed close to one another nearly on the same position, in which a first one of each pair of one-axis uni-directional accelerometers has a sensing direction directed to the Z-axis, while the second one of each pair of uni-directional accelerometers has a sensing direction parallel to the X-Y plane, and wherein said device further comprises a level regulator for allowing the height of the first one of each pair of one-axis uni-directional accelerometers to be aligned to the center of the second one of each pair of one-axis uni-directional accelerometers.

* * * * *

UNITED STATES PATENT AND TRADEMARK OFFICE
CERTIFICATE OF CORRECTION

PATENT NO.   : 6,128,955
DATED        : October 10, 2000
INVENTOR(S)  : Mimura

Page 1 of 2

It is certified that error appears in the above-identified patent and that said Letters Patent is hereby corrected as shown below:

Column 14, lines 1-4,
The Equation:                    Should be:

$$a = {}^{\circ}R \begin{bmatrix} {}^{\circ}\ddot{p}_b \\ {}^{\circ}\dot{\omega}_b \end{bmatrix} + \begin{bmatrix} {}^{\circ}u_1^T \{{}^{\circ}\omega_b \times ({}^{\circ}\omega_b \times {}^{\circ}r_1)\} \\ {}^{\circ}u_2^T \{{}^{\circ}\omega_b \times ({}^{\circ}\omega_b \times {}^{\circ}r_2)\} \\ \vdots \\ {}^{\circ}u_n^T \{{}^{\circ}\omega_b \times ({}^{\circ}\omega_b \times {}^{\circ}r_n)\} \end{bmatrix}$$

$$a = {}^{\cdot}R \begin{bmatrix} {}^{\cdot}\ddot{p}\,b \\ {}^{\cdot}\dot{\omega}\,b \end{bmatrix} + \begin{bmatrix} {}^{\cdot}u_1^T \{{}^{\cdot}\omega_b \times ({}^{\cdot}\omega_b \times {}^{\cdot}r_1)\} \\ {}^{\cdot}u_2^T \{{}^{\cdot}\omega_b \times ({}^{\cdot}\omega_b \times {}^{\cdot}r_2)\} \\ \vdots \\ {}^{\cdot}u_n^T \{{}^{\cdot}\omega_b \times ({}^{\cdot}\omega_b \times {}^{\cdot}r_n)\} \end{bmatrix}$$

Column 14, Lines 17-24,
The Equation:                    Should be:

$$a = [a_1 \ a_2 \ \ldots \ a_n]^T.$$

$${}^{\circ}R = \begin{bmatrix} {}^{\circ}u_1^T - {}^{\circ}u_1^T {}^{\circ}R_1 \\ {}^{\circ}u_2^T - {}^{\circ}u_1^T {}^{\circ}R_2 \\ \vdots \\ {}^{\circ}u_n^T - {}^{\circ}u_n^T {}^{\circ}R_n \end{bmatrix}, i = 1, 2, \ldots, n$$

$$a = [a_1 \ a_2 \ \cdots \ a_n]^T.$$

$$R = \begin{bmatrix} {}^{\cdot}u_1^T - {}^{\cdot}u_1^T {}^{\cdot}R_1 \\ {}^{\cdot}u_2^T - {}^{\cdot}u_2^T {}^{\cdot}R_2 \\ \vdots \\ {}^{\cdot}u_n^T - {}^{\cdot}u_n^T {}^{\cdot}R_n \end{bmatrix}, i = 1, 2, \cdots$$

UNITED STATES PATENT AND TRADEMARK OFFICE
CERTIFICATE OF CORRECTION

PATENT NO. : 6,128,955
DATED : October 10, 2000
INVENTOR(S) : Mimura

It is certified that error appears in the above-identified patent and that said Letters Patent is hereby corrected as shown below:

Column 16, Lines 17-24,
The Equation:                                     Should be:

$$a = [a_1 \ a_2 \ \cdots \ a_n]^T,$$

$$^\circ R = \begin{bmatrix} [^\circ u_1^T - ^\circ u_1^T {}^\circ R_1] \\ [^\circ u_2^T - ^\circ u_1^T {}^\circ R_2] \\ \vdots \\ [^\circ u_n^T - ^\circ u_1^T {}^\circ R_n] \end{bmatrix}, i = 1,2,\ldots,n$$

$$a = [a_1 \ a_2 \ \cdots \ a_n]^T.$$

$$R = \begin{bmatrix} [^*u_1{}^T - {}^*u_1{}^T \ {}^*R_1] \\ [^*u_2{}^T - {}^*u_2{}^T \ {}^*R_2] \\ \vdots \\ [^*u_n{}^T - {}^*u_n{}^T \ {}^*R_n] \end{bmatrix}, i = 1,2,\ldots,n$$

Signed and Sealed this

Fifth Day of February, 2002

Attest:

JAMES E. ROGAN
*Attesting Officer*         *Director of the United States Patent and Trademark Office*